United States Patent [19]

Lagergren et al.

[11] Patent Number: 4,732,035
[45] Date of Patent: Mar. 22, 1988

[54] METHOD AND APPARATUS FOR STORAGE TANK LEAK DETECTION HAVING TEMPERATURE COMPENSATION

[75] Inventors: Peter J. Lagergren, Arlington; C. Cameron Allen, Jr., Richardson, both of Tex.

[73] Assignee: Pandel Instruments, Inc., Grand Prairie, Tex.

[21] Appl. No.: 11,922

[22] Filed: Feb. 6, 1987

[51] Int. Cl.$^4$ ............................................. G01M 3/32
[52] U.S. Cl. ........................................ 73/49.2; 73/293
[58] Field of Search ................... 73/49.2, 49.3, 290 V, 73/293, 295, 296; 356/358

[56] References Cited

U.S. PATENT DOCUMENTS 4,373,815  2/1983  Bruce .............................. 73/293 X

FOREIGN PATENT DOCUMENTS 1917282 10/1970  Fed. Rep. of Germany ....... 73/49.2
1126419  7/1956  France ............................. 73/290 V

OTHER PUBLICATIONS

Underground Tank Leak Detection Methods: A State of the Art Review, United States Environmental Protection Agency EPA/600/2-86/001.

Primary Examiner—Stewart J. Levy
Assistant Examiner—Joseph W. Roskos
Attorney, Agent, or Firm—David H. Judson

[57] ABSTRACT

A method and apparatus for substantially eliminating measuring inaccuracies in a storage tank leak detection system caused by temperature-induced volumetric changes in the stored fluid product is described. In a preferred embodiment of the method, a limp bladder is connected to an end of a pressure tube having an inlet and a substantially hollow core. The pressure tube and the bladder are filled with a medium having a temperature coefficient substantially lower than the temperature coefficient of the fluid product. The pressure tube and the bladder are then supported in a substantially vertical manner in the storage tank such that a first portion of the medium is supported in the bladder in static equilibrium with respect to a second portion of the medium supported in the pressure tube. The large disparity between the temperature coefficients of the medium and the fluid product insures that temperature-induced volumetric changes in the fluid product do not vary the level of the medium in the pressure tube. Accordingly, variations in the medium level in the tube represent a true indication of leakage of the fluid product out of the storage tank or leakage of a foreign product into the storage tank.

26 Claims, 4 Drawing Figures

METHOD AND APPARATUS FOR STORAGE TANK LEAK DETECTION HAVING TEMPERATURE COMPENSATION

TECHNICAL FIELD

The present invention relates generally to leak detection techniques for liquid storage tanks and particularly to a method and apparatus for substantially eliminating measuring inaccuracies in an underground storage tank leak detection system caused by temperature-induced volumetric changes in the liquid stored in the tank.

BACKGROUND OF THE INVENTION

Underground storage tanks are used to store hazardous substances and petroleum products. It is estimated that a significant proportion of the nearly five million tanks in the United States are leaking harmful products into the environment. To ameliorate this problem, the Environmental Protection Agency (the "EPA") has recently promulgated regulations which require that any leakage exceeding a rate of 0.05 gallons per hour be detected and contained.

Methods for detecting leaks in underground storage tanks are well known in the prior art. Most of these techniques use a quantitative approach to identify a leak or to determine leak rate based on a measurement of volumetric changes of the stored product in the tank. The capability of prior art leak detection methods to accurately measure leakage is affected by certain variables such as temperature change, tank deformation, product evaporation, tank geometry and the characteristics of the stored product. The most significant of these factors is temperature variation, which causes dynamic expansion or contraction of the stored product on both a short-term and long-term basis. Indeed, changes in ambient temperature throughout the day are often large enough so as to "mask" the leakage rate to be measured. For example, a change of 0.01° F. per hour in a 10,000 gallon tank will cause a 0.068 gallon change in the product volume per hour, thus offsetting or amplifying an observed leak rate.

Most of the prior art methods for leak detection attempt to compensate for such temperature variations. In quantitative techniques, i.e., tests based on product volume changes, temperature in the tank is typically sensed by a plurality of temperature sensors located at various levels or stratifications therein. The sensed temperature data is collected and processed to measure the volumetric average of product temperature during a test. Other techniques attempt to compensate for temperature variations by performing the leak test over very short or long time intervals. All such techniques are unsuccessful because of the difference between the measured temperature change and the actual temperature change during the applicable test interval.

One potential solution to the problem of temperature-induced volumetric changes in underground storage tank leak detection involves the use of a two-tube laser interferometer system. This system consists of two laser interferometers attached respectively to two equal length tubes extending to the bottom of the tank. Each tube contains an aluminum float having a corner cube reflector. A signal processing circuit is used to process the data. The technique simultaneously measures the difference in the height of the product in each tube, with one of the tubes being open and the other closed but both tubes initially filled to the same level. Height changes in the open tube caused by thermally-induced volume changes are compensated for by subtracting the height changes in the closed tube. Although this system successfully reduces the effects of temperature-induced volume changes during leak detection, it is extremely costly to implement and operate. Such techniques are thus wholly impractical for widespread commercial use.

Accordingly, there is a need for a reliable and economical method and apparatus for eliminating temperature effects in a storage tank leak detection system which overcomes these and other problems associated with prior art techiques.

BRIEF SUMMARY OF THE INVENTION

According to the present invention, a method and apparatus for substantially eliminating measuring inaccuracies in an underground storage tank leak detection system caused by temperature-induced volumetric changes in the stored product is described.

The preferred apparatus comprises an elongated pressure tube having first and second ends, an inlet adjacent the first end, and a substantially hollow core for supporting a liquid having a volumetric coefficient of expansion per degree Fahrenheit or Centigrade (a so-called "temperature coefficient") substantially lower than the temperature coefficient of the stored product. A bladder, formed of a material which expands or contracts with substantially no resistance to flow of the low temperature coefficient liquid, is connected to the pressure tube adjacent the second end thereof. The bladder supports a first portion of the low temperature coefficient liquid in static equilibrium with respect to a second portion of the liquid supported in the tube. The large disparity between the temperature coefficients of the liquid and the stored product insures that temperature-induced volumetric changes in the stored product do not cause material variations in the level of the liquid in the pressure tube. Accordingly, any fluctuation in the liquid level in the tube represents a true indication of leakage of the fluid product out of the storage tank or leakage of a foreign product (e.g., ground water) into the storage tank.

According to a preferred method of the present invention for detecting a leak in an underground storage tank having a hydrocarbon or like product stored therein, a limp bladder is connected to an end of a pressure tube having an inlet and a substantially hollow core. The pressure tube and the bladder are then filled with a liquid, e.g., methylalkyl silicone ("MAS"), which has a temperature coefficient substantially lower than the temperature coefficient of the hydrocarbon or like product stored in the tank. The pressure tube and the bladder are then supported in the storage tank such that a first portion of the low temperature coefficient liquid is supported in the bladder in static equilibrium with respect to a second portion of the liquid supported in the tube. As described above, the large disparity between the temperature coefficients of the liquid and the hydrocarbon product insures that temperature-induced volumetric changes in the stored product do not vary the level of the liquid in the pressure tube. Variations in the level of the liquid in the tube are then sensed to detect the existence of a leak.

In one embodiment, variations in the level of the liquid in the pressure tube are sensed using an interferometer, a reflector supported in the tube, and appropriate signal processing circuitry. Preferably, an additional bladder is connected to the inlet of the pressure tube for sealing and protecting the liquid from contamination with the high temperature coefficient stored fluid product. This bladder is preferably filled with an inert gas such as nitrogen and argon.

BRIEF DESCRIPTION OF THE DRAWINGS

For a more complete understanding of the present invention and the advantages thereof, reference is now made to the following Description taken in conjunction with the accompanying Drawings in which:

FIG. 3 is a schematic diagram of a signal processing circuit for use with the apparatus of FIG. 2 for sensing variations in the level of the low temperature coefficient liquid in the pressure tube of the apparatus.

DETAILED DESCRIPTION

Figure 1:
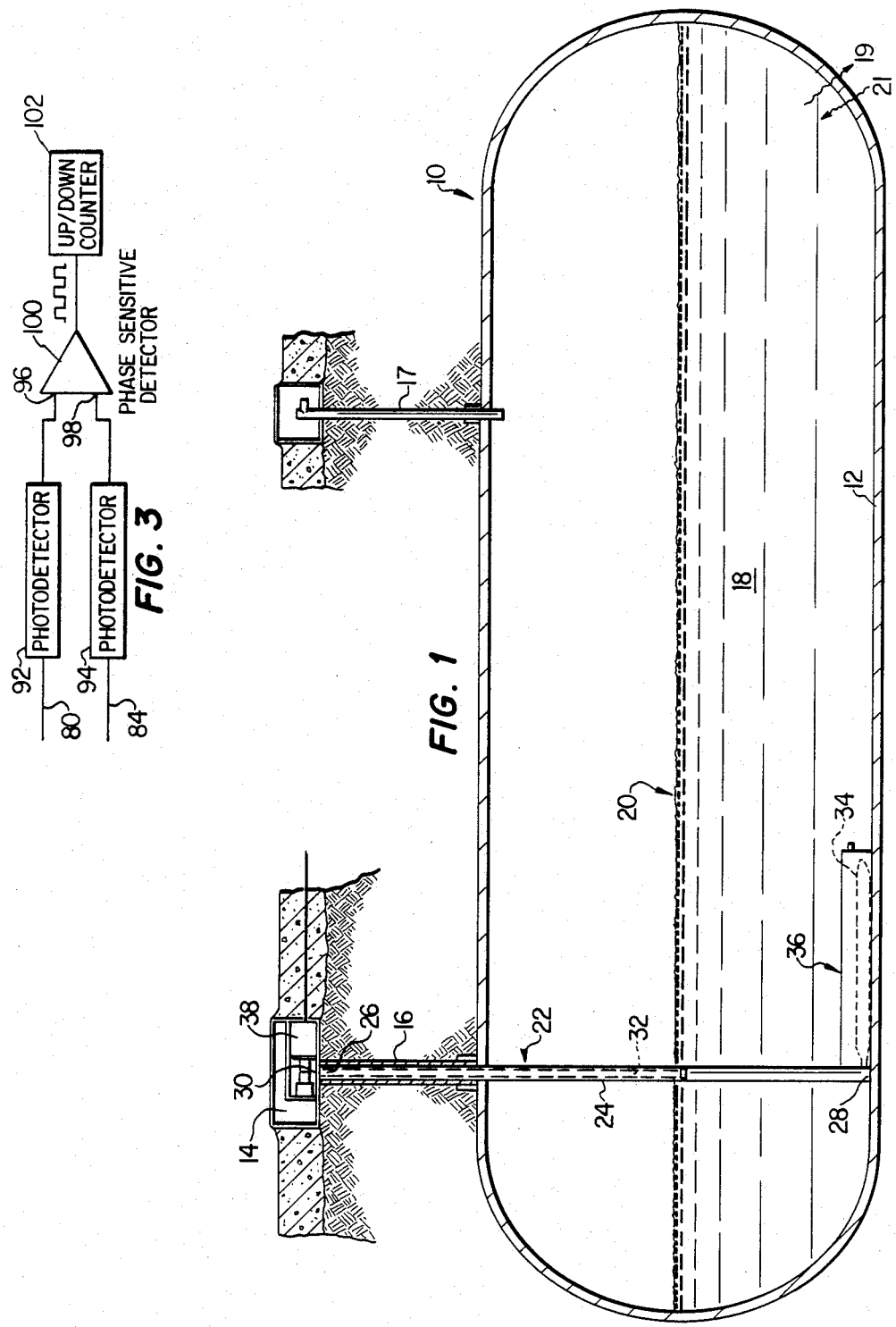
FIG. 1 is a sectional view of an underground storage tank having a fluid product stored therein.

With reference now to the drawings wherein like reference characters designate like or similar parts through the several views, FIG. 1 is a perspective view of an underground storage tank 10 in which the method and apparatus for leak detection of the present invention is used. As used herein, the term "underground" refers to any storage tank with at least some portion of its volume buried below ground. Such tanks are commonly used, for example, to store hazardous substances and hydrocarbon products such as gasoline and crude oil. Although the remainder of the following discussion is directed to use of the invention for leak detection in underground storage tanks, the present invention is not so limited. The temperature compensation principles described below are also applicable to above-ground storage tanks and other liquid containment vessels.

The underground storage tank 10 has a base 12 and is mounted with its longitudinal axis horizontal. The tank is generally located several feet below a manhole access port 14. A vertical riser pipe 16 is provided to connect an upper end of the tank 10 to the manhole access port 14, and a standpipe 17 is used to fill the tank. In particular, the tank 10 supports a fluid product 18, e.g., hydrocarbon fuel, which has a predetermined volumetric coefficient of expansion per degree Fahrenheit or Centigrade (a "temperature coefficient").

The level or height 20 (and therefore the volume) of the product 18 is affected by product leakage from the tank, designated by arrow 19, or leakage of foreign products into the tank, designated by arrow 21. Methods for detecting such leaks often use a quantitative analysis based on the measurement of volume changes of the product 18 over time. Such techniques, however, do not effectively compensate for temperature-induced volume changes in the product 18, thereby preventing accurate detection of leakage or leak rate. For example, if the tank 10 is a standard 6′×20′ tank used in underground automobile service station installations, a temperature change as small as 0.01° F. per hour can produce a large enough change in the product volume so as to offset or amplify an observed leak rate.

Referring back to FIG. 1, the problem of temperature-induced "masking" associated with prior art storage tank leak detection methods is overcome through use of a temperature compensation apparatus 22. Preferably, the apparatus 22 comprises an elongated pressure tube or manometer 24 which is supported in a substantially vertical manner in the tank 10 by the vertical riser pipe 16 or some other temporary or permanent means located in the tank. The pressure tube 24 is formed of a low temperature coefficient material, e.g., steel, brass or plastic, and has a first end 26, a second end 28, an inlet 30 adjacent the first end 26, and a substantially hollow core 32. The vertical riser pipe 16 or other support structure (e.g., a bracket within the tank) supports the pressure tube 24 in a manner such that the second end 28 of the tube 24 is located adjacent the base 12 of the tank 10. As also seen in FIG. 1, a limp bladder 34 is connected to the pressure tube 24 adjacent the second end 28 thereof for the purposes described below. A housing 36 may be provided overlaying the bladder 34 to prevent damage thereto during installation and/or operation of the apparatus 22.

According to one important feature of the present invention, the elongated pressure tube 24 and the limp bladder 34 support a medium, e.g., a liquid, a liquid mixture or free flowing particles, having a temperature coefficient substantially lower than the temperature coefficient of the stored fluid product 18. The large disparity between the temperature coefficients of the medium supported in the pressure tube/bladder and the product 18 stored in the tank insures that temperature-induced volumetric changes in the product 18 do not "mask" leakage of the stored product out of the storage tank 10 or leakage of a foreign product into the tank. The apparatus 22 also includes a measuring device, designated generally by the reference numerical 38, for detecting true leakage into and from the storage tank 10.

Significantly, the limp bladder 34 is formed of a material which expands or contracts with substantially little or no resistance to flow of the low temperature coefficient medium. The material, e.g., polyethylene or other plastic, therefore contributes an insignificant amount of hydrostatic pressure to the medium in the tube 24. For the purposes of the following discussion, the preferred "medium" is a low temperature coefficient liquid such as methyalkyl silicone ("MAS") or a fluorocarbon product.

Figures 2, 4:
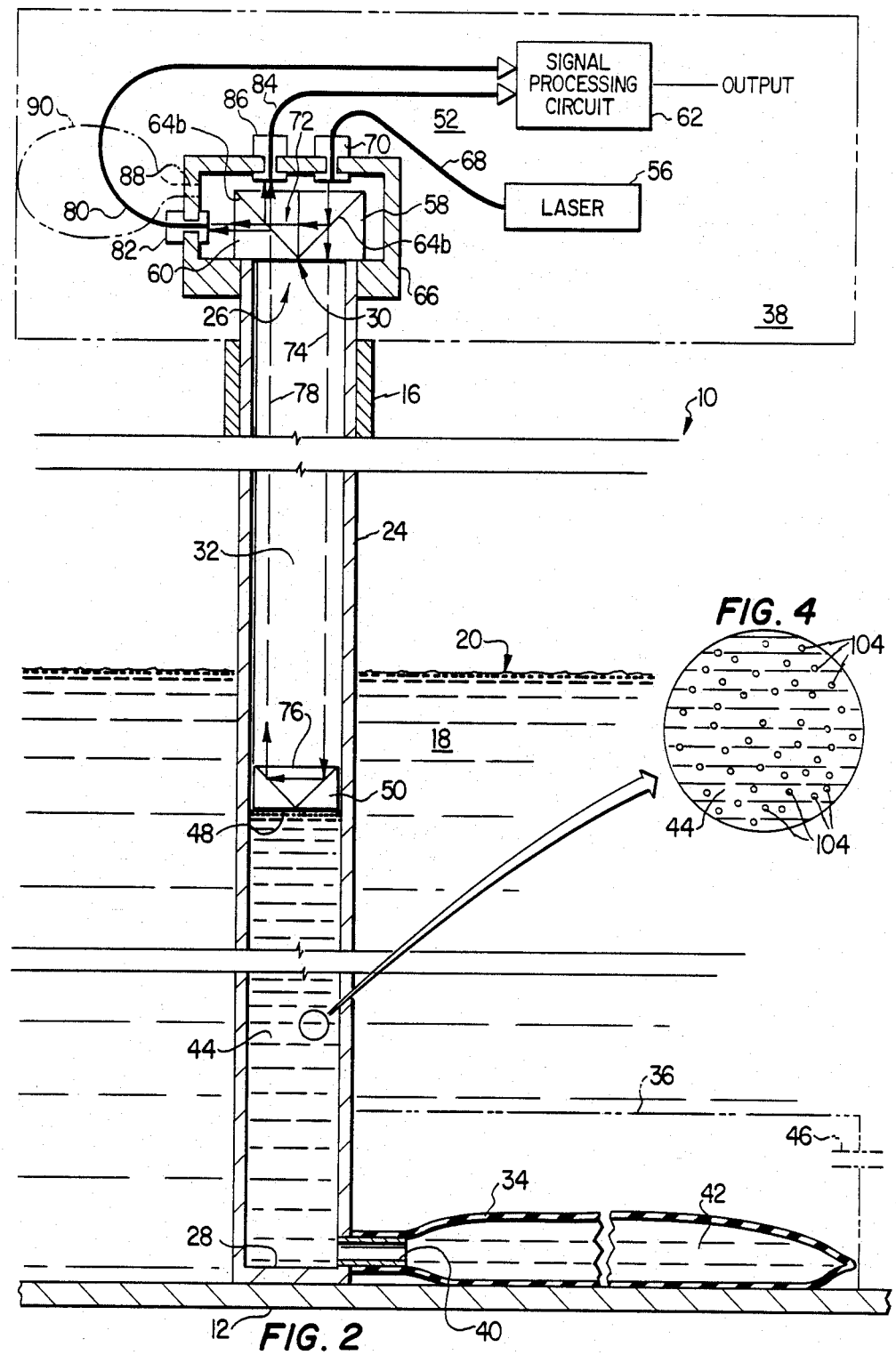
FIG. 2 is a detailed sectional view of the preferred apparatus of the invention for substantially eliminating measuring inaccuracies during leak detecting caused by temperature-induced volumetric changes in the fluid product stored in the storage tank of FIG. 1.
FIG. 4 is a sectional view of a portion of a low temperature coefficient liquid mixture for use in an alternative embodiment of the invention wherein micro-balloons are used as part of the mixture to produce a lower temperature coefficient.

Referring now to FIG. 2, a detailed sectional view of the apparatus 22 of FIG. 1 is shown. As described above, the apparatus 22 substantially eliminates measuring inaccuracies during leak detection caused by temperature-induced volumetric changes in the fluid product 18 stored in the storage tank 10. As seen in FIG. 2, the bladder 34 is securely fastened around a connecting conduit 40 integral to the second end 28 of the pressure tube 24. Accordingly, the interior volume of the bladder 34 supports a first portion 42 of the low temperature coefficient liquid in static equilibrium with respect to a second portion 44 of the liquid supported in the pressure tube 24.

As also seen in FIG. 2, the bladder 34 is supported by the base 12 of the storage tank 10 external to the pressure tube 10. As described above with respect to FIG. 1, the housing 36 preferably overlays the bladder 34 to protect the bladder 34 from damage during installation and/or operation of the apparatus. A vent 46 is provided in the housing to insure that the low temperature coefficient liquid portions supported in the pressure tube 24 and the bladder 34 remain in static equilibrium.

In operation, the pressure tube 24 and the limp bladder 34 are filled with the low temperature coefficient liquid and the tube is supported in a substantially vertical manner in the tank 10. The level 48 of the low temperature coefficient liquid in the pressure tube 24 is theoretically affected by the level (and volume) of the product 18 in the tank. However, while temperature-induced volume changes in the product cause the surface level 20 of the product to change, the level 48 of the liquid in the tube 24 remains substantially constant. This is because of the large disparity between the temperature coefficients of the liquid and the product 18. Accordingly, any variation in the level 48 of the second portion 44 of the liquid in the tube 24 represents a true indication of the leakage of the fluid product 18 out of the storage tank or leakage of a foreign product into the storage tank independent of temperature-induced product volume changes.

Variations in the level 48 of the liquid in the pressure tube 24 are sensed by the measuring device 38 which, in one embodiment, includes a float 50 supported by the second portion 44 of the low temperature coefficient liquid. The float is preferably formed of aluminum or a like metal. The measuring device 38 preferably includes an interferometer 52 which measures interference patterns produced from signal waveforms bounced off of the float 50 to determine vertical displacement of the float and thus variations in the level of the low temperature coefficient liquid. As described above, such displacement represents true detection of a leak into or out of the storage tank 10. As seen in FIG. 2, the interferometer 52 is supported adjacent the first end 26 of the pressure tube 24 for generating the signal waveforms for use in detecting movement of the float 50 within the pressure tube 24. For the purposes of the following discussion, the interferometer will be described as using light as the signal waveform. It should be appreciated, however, that interferometers based on other characteristic waveforms, such as RF electromagnetic or sound waves, may be used as the measuring device 38.

The interferometer 52 generally includes a laser 56, a pair of first and second cube beamsplitters 58 and 60, and a signal processing circuit 62. The first and second cube beamsplitters 58 and 60 each contain a conventional half-silvered mirror, designated respectively by the reference numerals 64a and 64b, and are supported adjacent the inlet 30 of the pressure tube 24 by a housing 66. In operation, a signal from the laser 56 is input to the first cube beamsplitter 58 via a fiber optic conductor 68 supported in a bulkhead 70 of the housing 66. The mirror 64a in the first cube beamsplitter 58 receives this signal and in response thereto generates a reference signal 72 and a transmitted signal 74.

To detect variations in the level 48 of the low temperature coefficient liquid in the pressure tube 24, the transmitted signal 74 is reflected from a corner cube reflector 76 supported in the float 50 to form a reflected signal 78. The cube beamsplitter 60 receives the reflected signal 78 from the reflector 76 and combines this signal with the reference signal 72 to produce first and second output signals. Specifically, the reflected signal 78 is reflected 90° by the mirror 64b and added to the reference signal 72 to produce the first output signal, i.e., an interference fringe pattern, which is coupled from the housing 66 via a fiber optic conductor 80 supported in a bulkhead 82. The mirror 64b also produces the second output signal which, because it passes directly through mirror 64b, is offset in phase from the first output signal. The second output signal is coupled from the housing 66 via the fiber optic conductor 84 supported in a bulkhead 86. As will be described in more detail below, the first and second output signals are supplied via the fiber optic conductors 80 and 84 to the signal processing circuit 62.

Generally, circuit 62 determines the direction of motion of the interference fringes represented by the output signals, thereby indicating whether the corner cube reflector 76 supported in the float 50 is moving up or down and at what rate. If the level 48 of the liquid in the pressure tube 24 increases, then leakage of a foreign product (e.g., ground water) into the tank is indicated. To the contrary, if the level 48 of the liquid decreases, then a leak from the tank 10 is indicated. As described above, however, the large disparity between the temperature coefficients of the low temperature coefficient liquid and the high temperature coefficient stored product 18 insures that temperature-induced volumetric changes in the product have little or no material effect of the level 48 of the liquid.

As also seen in FIG. 2, the housing 66 for supporting the first and second cube beamsplitters 58 and 60 includes a vent 88 for insuring that the first and second portions 42 and 44 of the low temperature coefficient liquid remain in static equilibrium in the bladder and the pressure tube. In the preferred embodiment, a second limp bladder 90 is connected to the vent 88 and thus to the inlet 30 of the pressure tube 24 for sealing and protecting the low temperature coefficient liquid from contamination by the high temperature coefficient fluid product. Preferably, the bladder 90 is filled with an inert gas such as nitrogen or argon. If the bladder is not used, the manhole covering the manhole access port 14 must be opened to connect the vent 88 to atmospheric pressure.

Referring now to FIG. 3, a simplified schematic diagram is shown of one embodiment of the signal processing circuit 62 of FIG. 2. As described above, the signal processing circuit 62 operates generally to determine the direction of motion of the interference fringes in the first and second output signals produced by the cube beamsplitter 60. To this end, the first output signal is provided to a photodetector 92, e.g., a photodiode, phototransistor or PIN diode, via the fiber optic conductor 80. Likewise, the second output signal is provided to a photodetector 94 by the fiber optic conductor 84. Photodetectors 92 and 94 convert the (light) output signals into electrical signals in a conventional manner. The electrical outputs from the photodetectors 92 and 94 are connected to first and second inputs 96 and 98, respectively, of a phase sensitive detector 100, which generates output pulses representing the direction of phase motion between the electrical signals from the photodetectors 92 and 94. The output ppulses are then applied to an up/down counter 102 to indicate the level 48 of the low temperature coefficient liquid in the pressure tube 24.

As described above, the interferometer 52 of the measuring device 38 may use an RF electromagnetic wave as the measuring signal waveform. In this case, the laser 56 is replaced by an RF gunn diode, and appropriate microwave splitter devices are used in place of the first and second cube beamsplitters 58 and 60 of FIG. 2. Alternatively, the interferometer 52 may use an acoustic or sound wave in combination with the pressure tube/bladder mechanism for sensing variations in the height of the low temperature coefficient liquid in the pressure tube. For example, an acoustic transducer may be mounted adjacent the second end 28 of the tube 24 and facing upwards to transmit sound waves between the transducer and a reflector on the float 50. An acoustical interferometer is then used to process the signals produced by the acoustic transducer for sensing height variations.

The present invention thus substantially eliminates measuring inaccuracies in a storage tank leak detection system due to temperature-induced volumetric changes in a stored product. This objective is achieved by using a low thermal coefficient of expansion medium, e.g., liquid, a liquid mixture or uniform density particles, contained in a pressure tube connected to a pressure-equalized limp bladder. The level or height of the low temperature coefficient medium in the tube is directly affected by the level or volume of the fluid product in the tank. However, as long as the temperature coefficient of the stored product is significantly higher than the temperature coefficient of the medium, volumetric changes in the product due to temperature have substantially no effect on the surface level of the low temperature coefficient medium.

Generalizing, as long as the mass of the fluid product stored in the tank remains constant, the volume thereof can expand and contract with temperature changes without affecting the level of an ideal liquid in the pressure tube/bladder having a zero temperature coefficient. This relationship can be proven by comparing the height "$H_0$" of the low temperature coefficient liquid in the tube with the height "$H_1$" of a theoretical column of the product with equivalent volume:

$$H_0 = \frac{P_0}{gd_0} \ ; H_1 = \frac{P_1}{gd_1}$$

where "$P_0$" equals the pressure at the bottom of the liquid column, "$P_1$" equals the pressure at the bottom of the theoretical column of the product, "$d_0$" equals the density of the low temperature coefficient liquid, "$d_1$" equals the density of the stored product and "g" represents gravity. For the two columns to be in static equilibrium, "$P_0$" must equal "$P_1$" and therefore:

$$\frac{H_1 d_1}{H_0 d_0} = 1. \tag{1}$$

The quantity "$H_0 d_0$" changes very little due to thermal expansion and contraction because of the low temperature coefficient of the liquid and because height changes are accompanied by an exact corresponding decrease in density. If equation (1) is to remain true, then the quantity "$H_1 d_1$" must therefore remain constant. Accordingly, the level of the low temperature coefficient liquid in the tube is an indication of the mass of the fluid product in the theoretical column.

The temperature coefficient of the liquid supported in the pressure tube and bladder is preferably at least one order of magnitude lower than the temperature coefficient of the product stored in the storage tank. More accuracy in the leak detection process is achieved if the temperature coefficient of the fluid product is at least twenty (20) times the temperature coefficient of the low temperature coefficient liquid. Accordingly, when hydrocarbon fuel is the stored product, the low temperature coefficient liquid is preferably methylalkyl silicone ("MAS") because the fuel has a temperature coefficient equal to 0.00081 per degree Centigrade whereas MAS has a temperature coefficient approximately equal to 0.00004 per degree Centigrade. In a theoretical column of the fuel, the level thereof will expand 0.08% for each 1° Centigrade temperature change. The associated volumetric change of the MAS column is 0.004% per degree C. Because the thermal expansion/contraction of the liquid is only 5% of the hydrocarbon fuel, the magnitude of the level change in the tube is significantly reduced.

A lower temperature coefficient for the medium in the pressure tube/bladder is achieved by using a liquid mixture of methylalkyl silicone and a plurality of micro-balloons 104, i.e., glass or plastic microspheres, as shown in the sectional view of FIG. 4. The micro-balloons 104 are mixed with the low temperature coefficient liquid methylalkyl silicone in a stable suspension to produce a liquid mixture having a substantially lower temperature coefficient than the temperature coefficient of the methylalkyl silicone by itself. Of course, other low temperature coefficient liquids or liquid mixtures may be used in conjunction with the apparatus and method of the present invention. Alternatively, the micro-balloons 104 may be used as the low temperature coefficient medium in the bladder/pressure tube without being mixed with the liquid MAS. In this case, because the density "$d_o$" of the (dry) micro-balloons 104 is approximately equal to the density "$d_1$" of the fluid product, the level "$H_o$" is significantly higher than the level "$H_1$".

The present invention therefore describes a method and apparatus for substantially eliminating measuring inaccuracies in a storage tank leak detection system caused by temperature-induced volumetric changes in the stored fluid product. In a preferred embodiment of the method, a limp bladder is connected to an end of a pressure tube have an inlet and a substantially hollow core. The pressure tube and the bladder are filled with a medium having a temperature coefficient substantially lower than the temperature coefficient of the fluid product. When the pressure tube and the bladder are supported in a substantially vertical manner in the storage tank such that a first portion of the medium is supported in the bladder in static equilibrium with respect to a second portion of the medium supported in the pressure tube, the large disparity between the temperature coefficients of the medium and the fluid product insures that temperature-induced volumetric changes in the fluid product do not materially vary the level of the medium in the pressure tube. Variations in the level of the medium in the tube are then sensed to represent a true indication of leakage into and from the storage tank.

It should be appreciated that the pressure tube/bladder apparatus of the invention does not completely compensate for all thermal effects. For example, an extremely small amount of thermal noise may still exist during the measurement process, however, the effects of this noise are easily compensated for during the liquid level measurement using microprocessor-based correction circuitry. Such circuitry can also be used to add a cosine "correction" factor to the level measurement if the pressure tube is not supported in the tank is a substantially vertical manner.

Although the invention has been described in detail, the same is by way of illustration and example only and is not to be taken by way of limitation, the spirit and scope of the invention being limited only to the terms of the appended claims.

What is claimed is:

1. A leak detection system for a storage tank having a fluid product stored therein, comprising:
    an elongated tube having first and second ends, an inlet adjacent to the first end, and a substantially hollow core for supporting a medium having a temperature coefficient substantially lower than the temperature coefficent of the fluid product;
    means for supporting the elongated tube in a substantially vertical manner in the storage tank such that the second end of the tube is located adjacent the base of the storage tank;
    a bladder connected to the tube adjacent the second and thereof for supporting a first portion of the medium in static equilibrium with respect to a second portion of the medium supported in the tube, wherein the large disparity between the temperature coefficients of the medium and the fluid product insures that temperature-induced volumetric changes in the fluid product do not vary the level of the medium in the tube; and
    means for sensing variations in the level of the medium in the tube to thereby detect leakage into and from the storage tank.

2. The leak detection system as described in claim 1 wherein the bladder is formed of a material which contributes substantially no hydrostatic pressure to the medium supported in the tube.

3. The leak detection system as described in claim 2 wherein the material is polyethylene.

4. The leak detection system as described in claim 1 wherein the bladder is supported by the base of the storage tank external to the tube.

5. The leak detection system as described in claim 1 wherein the elongated tube is formed of a material having a temperature coefficient substantially lower than the temperature coefficient of the fluid product.

6. The leak detection system as described in claim 1 wherein the medium is liquid methyalkyl silicone.

7. The leak detection system as described in claim 1 wherein the means for sensing comprises:
    a float supported by the medium within the tube and including a reflector; and
    an interferometer supported adjacent the first end of the tube for generating a signal for use in detecting movement of the float within the tube.

8. The leak detection system as described in claim 7 wherein the interferometer uses a light wave as the signal.

9. The leak detection system as described in claim 7 wherein the interferometer uses an RF electromagnetic wave as the signal.

10. The leak detection system as described in claim 7 wherein the interferometer uses a sound wave as the signal.

11. A leak detection system for an underground storage tank having a hydrocarbon product stored therein, comprising:
    an elongated manometer tube having first and second ends, an inlet adjacent the first end, and a substantially hollow core for supporting a liquid means having a temperature coefficient lower than the temperature coefficient of the hydrocarbon product by at least one order of magnitude;
    means for supporting the manometer tube in a substantially vertical manner in the underground storage tank such that the second end of the tube is located adjacent the base of the storage tank;
    a limp bladder connected to the tube adjacent the second end thereof for supporting a first portion of the liquid means in static equilibrium with respect to a second portion of the liquid means supported in the manometer tube, wherein the large disparity between the temperature coefficients of the liquid means and the hydrocarbon product insures that temperature-induced volumetric changes in the hydrocarbon product do not vary the level of the liquid means in the tube;
    a float supported by the liquid means within the manometer tube and including a corner cube reflector; and
    an interferometer supported adjacent the first end of the manometer tube for generating a signal for use in detecting movement of the float within the tube to thereby indicate a leak into or out of the storage tank.

12. The leak detection system as described in claim 11 wherein the bladder is formed of a material which contributes substantially no hydrostatic pressure to the liquid means in the pressure tube.

13. The leak detection system as described in claim 11 wherein the bladder is supported by the base of the storage tank external to the pressure tube.

14. The leak detection system as described in claim 11 wherein the liquid means includes liquid methyalkyl silicone.

15. The leak detection system as described in claim 11 wherein the liquid means includes a mixture of liquid methyalkyl silicone and a plurality of micro-balloons in a stable suspension.

16. Apparatus for substantially eliminating measuring inaccuracies in a storage tank leak detection system caused by temperature-induced volumetric changes in the fluid product stored in the storage tank, comprising:
    an elongated tube having the first and second ends, an inlet adjacent the first end, and a substantially hollow core for supporting a medium having a temperature coefficient substantially lower than the temperature coefficient of the fluid product; and
    a first bladder connected to the tube adjacent the second end thereof for supporting a first portion of the medium in static equilibrium with respect to a second portion of the medium supported in the tube, wherein the large disparity between the temperature coefficients of the medium and the fluid product insures that temperature-induced volumetric changes in the fluid product do not vary the level of the medium in the tube when the tube is supported in the storage tank.

17. The apparatus as described in claim 16 wherein the elongated pressure tube is formed of a material having a temperature coefficient substantially lower than the temperature coefficient of the fluid product.

18. The apparatus as described in claim 16 wherein the medium is liquid methylalkyl silicone.

19. The apparatus as described in claim 16 wherein the medium is plurality of micro-balloons.

20. A method for detecting a leak in a storage tank having a fluid product stored therein, comprising the steps of:

connecting a bladder to an end of a tube having an inlet and a substantially hollow core;

filling the tube and the bladder with a medium having a temperature coefficient substantially lower than the temperature coefficient of the product;

supporting the tube and the bladder in the storage tank such that a first portion of the medium is supported in the bladder in static equilibrium with respect to a second portion of the medium supported in the tube, wherein the large disparity between the temperature coefficients of the medium and the product insures that temperature-induced volumetric changes in the product do not vary the level of the medium in the tube; and sensing variations in the level of the medium in the tube to thereby detect a leak in the storage tank.

21. A method for substantially eliminating measuring inaccuracies in a storage tank leak detection system caused by temperature-induced volumetric changes in the fluid product stored in the storage tank, comprising the steps of:

connecting a bladder to an end of a pressure tube having an inlet and a substantially hollow core;

filling the pressure tube and the bladder with a liquid having a temperature coefficient substantially lower than the temperature coefficient of the fluid product; and supporting the pressure tube and the bladder in a substantially vertical manner in a storage tank such that a first portion of the liquid is supported in the bladder in static equilibrium with respect to a second portion of the liquid supported in the tube, wherein the large disparity between the temperature coefficients of the liquid and the fluid product insures that temperature-induced volumetric changes in the fluid product do not vary the level of the liquid in the pressure tube.

22. A leak detection system for a storage tank having a fluid product stored therein, comprising:

an elongated tube having first and second ends, an inlet adjacent to the first end, and a substantially hollow core for supporting a medium having a temperature coefficient substantially lower than the temperature coefficient of the fluid product;

means for supporting the elongated tube in a substantially vertical manner in the storage tank such that the second end of the tube is located adjacent the base of the storage tank;

a bladder connected to the tube adjacent the second end thereof for supporting a first portion of the medium in static equilibrium with respect to a second portion of the medium supported in the tube, wherein the large disparity between the temperature coefficients of the medium and the fluid product insures that temperature-induced volumetric changes in the fluid product do not vary the level of the medium in the tube;

means for sensing variation in the level of the medium in the tube to thereby detect leakage into and from the storage tank; and a bladder connected to the inlet of the elongated tube for sealing and protecting the medium from contamination by the fluid product.

23. The leak detection system as described in claim 22 wherein the bladder connected to the inlet of the elongated tube is filled with an inert gas.

24. A leak detection system for an underground storage tank having a hydrocarbon product stored therein, comprising:

an elongated manometer tube having first and second ends, an inlet adjacent the first end, and substantially hollow core for supporting a liquid means having a temperature coefficient lower than the temperature coefficient of the hydrocarbon product by at least one order of magnitude;

means for supporting the manometer tube in a substantially vertical manner in the underground storage tank such that the second end of the tube is located adjacent the base of the storage tank;

a limp bladder connected to the tube adjacent the second end thereof for supporting a first portion of the liquid means in static equilibrium with respect to a second portion of the liquid means supported in the manometer tube, wherein the large disparity between the temperature coefficients of the liquid means and the hydrocarbon product insures that temperature-induced volumetric changes in the hydrocarbon product do not vary the level of the liquid means in the tube;

a float supported by the liquid means within the manometer tube and including a corner cube reflector;

an interferometer supported adjacent the first end of the manometer tube for generating a signal for use in detecting movement of the float within the tube to thereby indicate a leak into or out of the storage tank; and a bladder connected to the inlet of the manometer tube for sealing and protecting the liquid means from contamination by the hydrocarbon product.

25. Apparatus for substantially eliminating measuring inaccuracies in a storage tank leak detection system caused by temperature-induced volumetric changes in the fluid product stored in the storage tank, comprising:

an elongated tube having first and second ends, an inlet adjacent the first end, and a substantially hollow core for supporting a medium having a temperature coefficient substantially lower than the temperature coefficient of the fluid product;

a first bladder connected to the tube adjacent the second end thereof for supporting a first portion of the medium in static equilibrium with respect to a second portion of the medium supported in the tube, wherein the large disparity between the temperature coefficients of the medium and the fluid product insures that temperaure-induced volumetric changes in the fluid product do not vary the level of the medium in the tube when the tube is supported in the storage tank; and a second bladder connected to the inlet of the tube for sealing and protecting the medium from contamination by the fluid product.

26. The appparatus as described in claim 25 wherein the first and second bladders are formed of material which contributes substantially no hydrostatic pressure to the medium in the tube.

* * * * *